US007161738B2

(12) United States Patent
Disano et al.

(10) Patent No.: US 7,161,738 B2
(45) Date of Patent: Jan. 9, 2007

(54) SECURE DOCUMENT OF VALUE AND METHOD OF MANUFACTURING SAME

(75) Inventors: John N. Disano, Ottawa (CA); Omar Caporaletti, Mississauga (CA)

(73) Assignee: Agra Vadeko Inc., Oakville (CA)

( * ) Notice: Subject to any disclaimer, the term of this patent is extended or adjusted under 35 U.S.C. 154(b) by 110 days.

(21) Appl. No.: 10/636,786

(22) Filed: Aug. 7, 2003

(65) Prior Publication Data

US 2005/0029800 A1 Feb. 10, 2005

(51) Int. Cl.
*G02B 1/10* (2006.01)

(52) U.S. Cl. ........................ 359/585; 359/586; 283/91; 283/72

(58) Field of Classification Search ................ 359/586, 359/580, 582, 584, 585, 589; 283/91, 72, 283/107, 109, 114, 117, 901, 902
See application file for complete search history.

(56) References Cited

U.S. PATENT DOCUMENTS 3,858,977 A 1/1975 Baird et al. ................... 356/71
4,186,943 A 2/1980 Lee ............................. 283/91
4,869,778 A * 9/1989 Cote ........................... 216/103
5,093,184 A * 3/1992 Edwards .................. 428/195.1
5,688,587 A * 11/1997 Burchard et al. ........... 442/330
6,036,232 A * 3/2000 Kaule et al. .................. 283/85
2004/0101676 A1* 5/2004 Phillips et al. .............. 428/323

* cited by examiner

*Primary Examiner*—Arnel C. Lavarias
(74) *Attorney, Agent, or Firm*—Baker & Daniels LLP

(57) ABSTRACT

A secure document value includes a sheet-like substrate and a thin film, optically variable security device on the substrate. The security device includes a carrier and a multilayer coating on the carrier. The multilayer coating includes a dielectric-metal stack having an exposed reflective layer that is tailored after manufacture to include security data proprietary to the issuer of the document of value thereby to deter forgery. Since the security device is tailored after manufacture, the end supplier of the document of value does not need to provide the proprietary information to the manufacturer of the security device for incorporation therein. This also enables the manufacturer of the security device to stockpile material until such time the material must be customized to include proprietary data. This results in shorter lead times and better response to market demands.

27 Claims, 3 Drawing Sheets

SECURE DOCUMENT OF VALUE AND METHOD OF MANUFACTURING SAME

FIELD OF THE INVENTION

The present invention relates to document security and in particular to a secure document of value including a thin film, optically variable security device and to a method of manufacturing the same.

BACKGROUND OF THE INVENTION

Marking documents of value such as banknotes is common practice to deter forgery and allow counterfeit banknotes to be readily detected. For example, U.S. Pat. No. 3,858,977 to Baird et al. discloses an optical interference filter having an optical interference layer with a known characteristic of spectral reflectance and a different known characteristic of spectral transmittance, both of which vary with the angle of incident light on the interference filter. The interference filter is disposed on a banknote substrate over a colored portion thereof that is designed to absorb some of the light transmitted by the interference filter so that the interference filer exhibits a color change with a change in the angle of incident light.

U.S. Pat. No. 4,186,943 to Lee discloses a security device for a sheet element such as a banknote. The security device includes a thin film, optically variable element such as a strip or thread disposed within the thickness of the sheet element. The thin film element is in the form of a dichroic filter having a known spectral reflectance and transmittance. The sheet element has a pair of superposed windows between which the thin film element extends so as to be visible through each window. The dichroic filter includes a transparent Melinex substrate coated with a seven-layer stack of alternate high and low refractive index materials. Layers of high refractive index are disposed adjacent the sheet element and the top of the stack. The layers of high refractive index have a thickness equal to ¾ wavelength and have an index of refraction equal to 2.3. The layers of low refractive index have a thickness equal to ¼ wavelength and have an index of refraction equal to 1.55. This combination yields a thin film element that reflects green and transmits in magenta when viewed normally.

Unfortunately, consistently producing seven-layer dichroic filters of this nature in large numbers is a very difficult task, especially given the very tight color specifications required for use in banknotes. As will be appreciated, banknotes are produced in extremely large numbers (i.e. millions and in fact sometimes billions) and must be identical in order to avoid public confusion, which makes counterfeiting easier. In addition, the fabrication cost associated with producing the seven-layer dichroic filters is high, translating into a high banknote unit cost.

An alternative security device for banknotes including a metal-dielectric stack has been developed by Agra Vadeko Inc. of Oakville, Ontario, Canada, assignee of the present invention in collaboration with the Bank of Canada and is sold by De La Rue under the name Colorshift™. The security device is designed for use as a windowed security feature incorporated within the banknote. The security device exhibits a color change from magenta to green with a change in view angle and has been featured in over 4 billion banknotes worldwide. The metal-dielectric stack includes a polyethylene teraphathalate (PET) substrate with an Al/$SiO_2$/Inconel® multilayer coating on the substrate. The aluminum layer is disposed on the PET substrate and is demetallized to include images, patterns and/or text.

Although this security device is highly satisfactory for the protection of banknotes, because the aluminum layer is sandwiched between the PET substrate and the $SiO_2$ layer, the aluminum layer must be demetallized before the manufacturing process of the security device. This requires the end user of the security device i.e. the issuer of the banknotes, to disclose highly sensitive information to the security device manufacturer. In addition, since the aluminum layer must be demetallized in a separate process to include the images, patterns and/or text before the security device can be completed, longer lead times for security device manufacturers are required due to the fact that the security device manufacturers must wait for the images, patterns and/or text to be included on the aluminum layer, which are specific to a given customer and banknote denomination. This of course makes it virtually impossible for security device manufacturers to stockpile material and reduce manufacture lead times.

It is therefore an object of the present invention to provide a novel secure document of value including a thin film, optically variable security device and to a method of manufacturing the same.

SUMMARY OF THE INVENTION

According to one aspect of the present invention there is provided a document of value comprising:

a sheet-like substrate; and a thin film, optically variable security device on said substrate, said security device including a carrier and a multilayer coating on said carrier, said multilayer coating including a dielectric-metal stack having an exposed reflective layer that is tailored after manufacture.

Preferably, the dielectric-metal stack further includes a semi-transparent absorber layer disposed on the carrier and a dielectric layer disposed on the absorber layer. The exposed reflective layer is disposed on the dielectric layer. It is also preferred that the reflective layer is tailored to include security data in the form of at least one of an image, pattern or text.

In a preferred embodiment, the reflective layer is formed of aluminum and is tailored to include security data in the form of at least one of an image, pattern or text via a demetallization process. The absorber layer is an Ni/Cr/Fe semi-transparent alloy and the dielectric layer is formed of $SiO_2$.

In the case of banknotes, a cover layer is bonded to the reflective layer after tailoring and prior to incorporation of the security device on the banknote to improve handling and protect the dielectric-metal stack from wear and/or chemical attack. The carrier and cover layer are preferably formed of plastic material such as for example polyethylene teraphathalate (PET).

The security device is preferably in the form of a thread that is woven into a banknote. In this case windows are formed in the banknote at one or more locations to expose at least a portion of the thread so that its optically variable effect is visible when looking at the banknote from different angles.

In accordance with another aspect of the present invention there is provided a method of manufacturing a secure document of value including a sheet-like substrate and a thin film, optically variable security device incorporated into said sheet-like substrate, said method comprising the steps of:

tailoring a thin film optically variable security device including a carrier and a multilayer coating on the carrier by altering an exposed reflective layer of said multilayer coating to include at least one of an image, pattern or text after manufacture of said security device by a security device manufacture;

bonding a cover layer over said altered reflective layer; and incorporating the security device including said cover layer into said sheet-like substrate.

The present invention provides advantages in that during manufacture of the thin film optically variable security device, since the reflective layer of the multilayer is exposed, the reflective layer can be secured at the end of the secure document manufacturing process. This reduces material transfer between entities involved in the secure document manufacturing process. Also highly sensitive information can be preserved to the furthest extent possible in the secure document manufacturing process allowing the identity of the end customer to be kept confidential.

The present invention provides further advantages in that it enables semi-finished security device material to be stockpiled. As a result, supply chain pressures, which are very common in this industry, are reduced. Customers of security devices for banknotes are typically very demanding on delivery schedule. Also, since the reflective layer of the security device is exposed, the security data to be incorporated into the reflective layer can be changed quickly in an existing banknote series, if necessary, to thwart or deter new counterfeiting threats.

BRIEF DESCRIPTION OF THE DRAWINGS

An embodiment of the present invention will now be described more fully with reference to the accompanying drawings in which.

DETAILED DESCRIPTION F THE PREFERRED EMBODIMENT

The present invention relates generally to a secure document of value such as a banknote, security card or other sheet-like substrate that includes a security device to deter forgery and to a method of manufacturing the same. A thin film, optically variable security device is provided on the sheet-like substrate and is tailored after manufacture but prior to incorporation on the sheet-like substrate to avoid the supplier of the secure document of value from having to disclose highly sensitive information to the security device manufacturer. Tailoring within the context of the present application refers to marking of the security device so that it includes security data such as images, patterns, text and/or other identifiers proprietary to the issuer of the secure document of value that make forgery more difficult. A preferred embodiment of the present invention will now be described with reference to FIG. 1 to 4.

Figure 1:
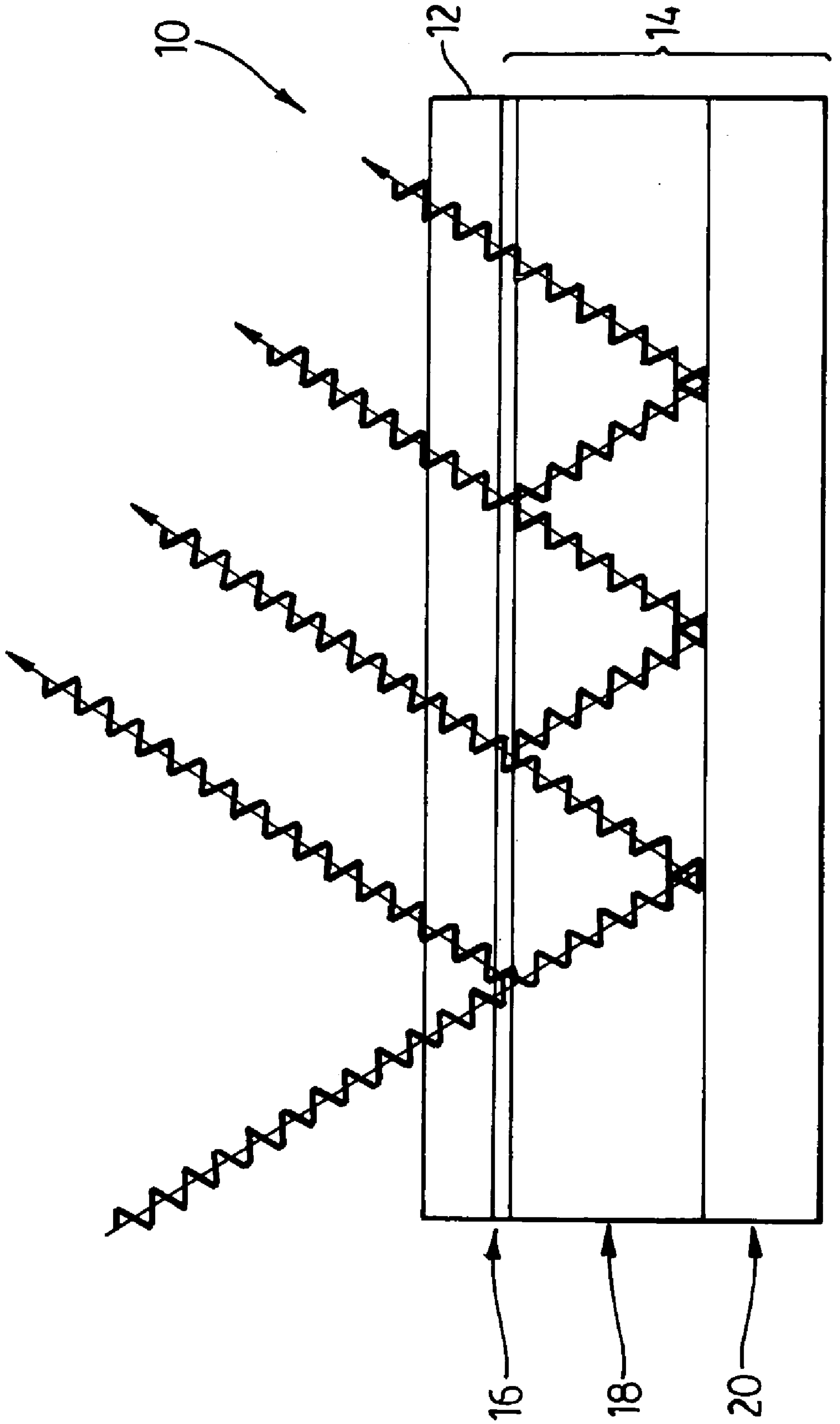
FIG. 1 is a side elevation view of a thin film optically variable security device.

Turning now to FIG. 1, a thin film, optically variable security device for incorporation into a document of value such as for example, a banknote, security card or other sheet-like substrate is shown and is generally identified by reference numeral 10. The security device 10 in the preferred embodiment is in the form of a thread that is designed to be woven into the document of value. As can be seen security device 10 includes a carrier 12 and a multilayer coating 14 on the carrier. Carrier 12 in the preferred embodiment is formed of polyethylene teraphathalate (PET) commonly referred to as polyester. Those of skill in the art will appreciate, however that other plastic material carriers may be used. Multilayer coating 14 is in the form of a metal-dielectric stack including an absorber layer 16 disposed on the carrier 12, a dielectric layer 18 disposed on the absorber layer 16 and a reflective layer 20 disposed on the dielectric layer 18. In the preferred embodiment, the absorber layer 16 is a semi-transparent Ni/Cr/Fe alloy commonly referred to as Inconel®. The dielectric layer 18 is formed of silicon dioxide ($SiO_2$) and the reflective layer 20 is formed of aluminum. The thickness of the absorber, dielectric and reflective layers 16 to 20 respectively are chosen so that the optically variable security device 10 exhibits the desired color shift with a change in the angle of incident light. For example, a security device having an Inconel® absorber layer 16 with a thickness of 10 nm, an $SiO_2$ dielectric layer 18 with a thickness of 350 nm and an aluminum reflective layer 20 with an optical density of between about 2.0 to 2.5 and a reflectance greater than 90% at 500 nm exhibits a very distinct magenta to green color shift with a change in view angle.

Other suitable materials for the semi-transparent absorber layer 16 include chromium, nickel, aluminum, silver, copper, palladium, platinum, titanium, vanadium, cobalt, iron, tin, tungsten, molybdenum, rhodium, niobium, carbon, graphite, silicon, germanium and compounds, mixtures or alloys thereof. Other suitable materials for the dielectric layer 18 include zinc sulfide, zinc oxide, zirconium oxide, zirconiumm dioxide, titanium dioxide, diamond-like carbon, indium oxide, indium-tin-oxide, tantalum pentoxide, cerium oxide, yttrium oxide, europium oxide, iron oxides, hafnium nitride, hafnium carbide, hafnium oxide, lanthanum oxide, magnesium oxide, magnesium fluoride, neodymium oxide, praseodymium oxide, samarium oxide, antimony trioxide, silicon monoxide, selenium trioxide, tin oxide, tungsten trioxide and combinations thereof as well as organic polymer acrylates. Other suitable materials for the reflective layer 20 include chromium, nickel, silver, copper, gold, palladium, platinum, titanium, vanadium, cobalt, iron, tin, tungsten, molybdenum, rhodium, niobium, carbon, graphite, silicon, germanium and compounds, mixtures or alloys thereof.

Figure 2A:
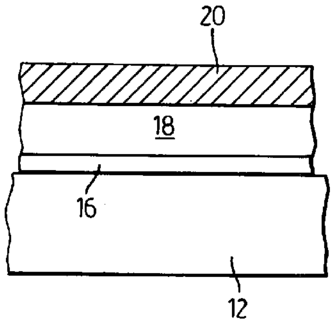
FIGS. 2*a* to 2*c* are side elevation views showing the steps performed during tailoring of the security device of FIG. 1.
Figure 2B:
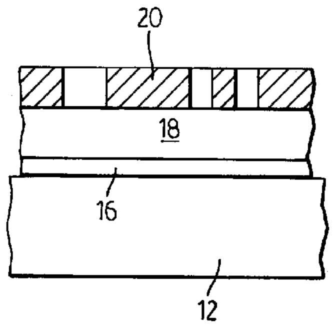
Figure 2C:
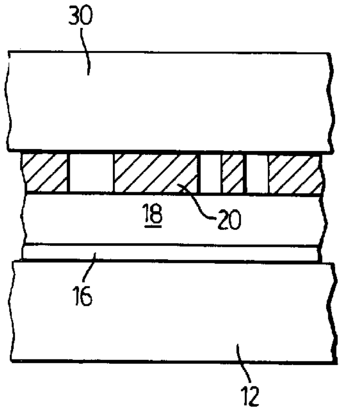

The security device 10 once manufactured is typically sent to a third party, who tailors the security device 10 prior to incorporating the security device into the document of value. FIGS. 2*a* to 2*c* show the steps performed during tailoring of the security device 10. As can be seen, during tailoring the reflective layer 20 is demetallized to include images, patterns and/or text. Tailoring the security device downstream of the security device manufacturing process is of course possible due to the fact that the reflective layer 20 of the multilayer coating 14 is exposed. In this manner, highly sensitive information including the identity of the end supplier of the document of value can be kept secret from the manufacturer of the security device 10. Also, the security device material can be fabricated and stockpiled ahead of time and demetallized just prior to delivery to reduce the typical long lead times associated with the production of such sophisticated technology.

Once the reflective layer 20 has been demetallized, a PET cover layer 30 is bonded to the reflective layer 20 via a layer of adhesive. In this manner, the multilayer coating 14 is protected against wear and chemical attack. The cover layer 30 and carrier 12 also help to improve handling. The security device 10 including the cover layer 30 is then coated with suitable adhesives and is incorporated into the document of value to secure it. Windows are provided in the document of value to expose the security device 10 so that its optically variable effect can be seen when looking at the secure document of value from different angles.

Figure 3:
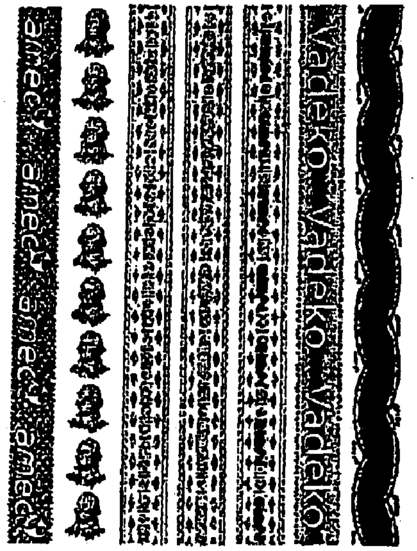
FIG. 3 is a top plan view of a tailored security device.

FIG. 3 shows various examples of a tailored security device 10. As can be seen, the reflective layer 20 in this case is tailored to include images, patterns and text including national symbols. Those of skill in the art will appreciate that any subset of images, patterns and text may be used to tailor the security device 10.

Figure 4:
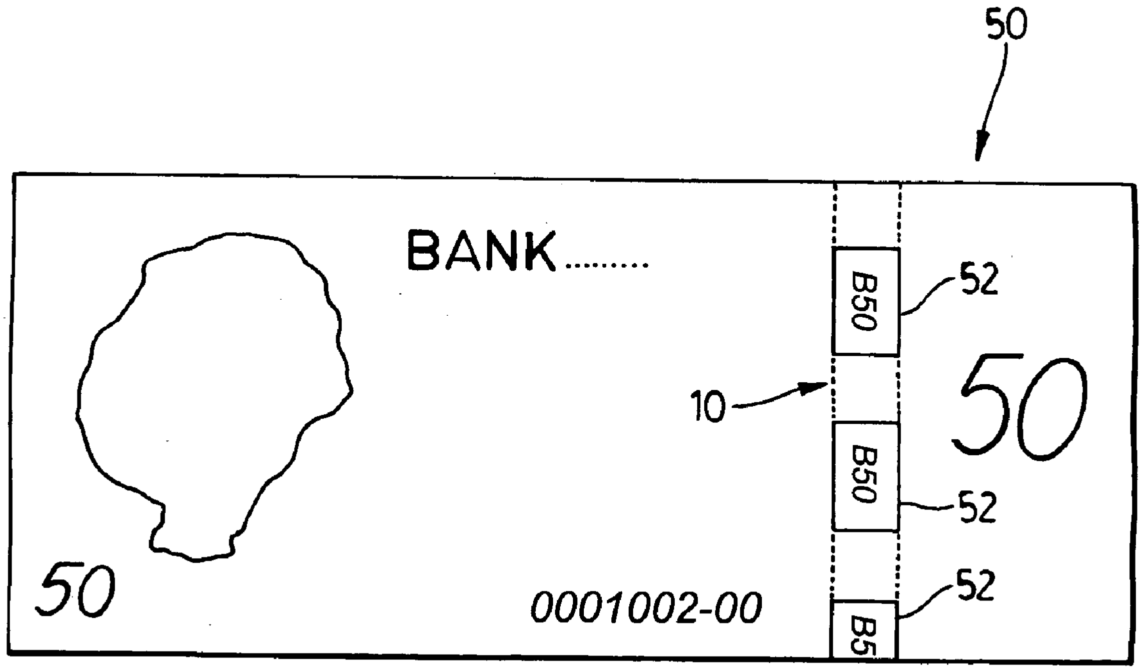
FIG. 4 is a top plan view of a secure document of value including a tailored security device.

FIG. 4 shows a tailored security device 10 woven into a document of value in the form of a banknote 50. In this case, the reflective layer of the security device 10 is tailored to include text only. Windows 52 provided in the banknote 50 expose the security device at discrete locations.

With the security device incorporated into the document of value, the security device provides the document of value with a variety of security attributes. For example, the security device exhibits a sharp color shift without the typical rainbox effect observed in other prior art optically variable devices and is resistant to physical and chemical attack. The color shift cannot be copied using modern reprographic methods. The color shift is easy to verify and to explain to the public making the security device simple for use by the public and document handles. The security device can be used as a first level security feature and/or as a machine readable security feature.

If desired, the carrier 12 can be embossed with an optical interference pattern or alternatively coated with a lacquer that is embossed with the optical interference pattern. The optical interference pattern may be selected from the group consisting of diffraction gratings, refraction patterns, holographic image patterns or combinations thereof. Preferably, the optical interference pattern includes microstructures having dimensions in the range of from about 0.1 to 10 microns.

Although the reflective layer 20 is described as being tailored through a demetallization process, those of skill in the art will appreciate that other techniques may be used to tailor the reflective layer. For example, images, patterns and/or text may be printed onto the reflective layer by various methods.

Also, although a preferred embodiment of the present invention has been described, those of skill in the art will appreciate that variations and modifications may be made without departing from the spirit and scope thereof as defined by the appended claims.

What is claimed is:

1. A document of value comprising:

a sheet-like substrate; and a thin film, optically variable security device on said substrate, said security device comprising a carrier and a multilayer coating on said carrier, said coating comprising a dielectric-metal stack of layers comprising an exposed reflective layer disposed on underlying layers of said dielectric-metal stack, the underlying layers of said dielectric-metal stack comprising at least one semi-transparent absorber layer disposed on said carrier and at least one dielectric layer disposed on said absorber layer, said reflective layer being demetallized at selected locations after manufacture of said security device to expose only the dielectric layer of said dielectric-metal stack directly beneath said reflective layer at said selected locations thereby to tailor said security device.

2. A document of value according to claim 1 wherein said reflective layer is tailored to include at least one of an image, pattern or text.

3. A document of value according to claim 2 wherein said reflective layer is selected from the group consisting of aluminum, chromium, nickel, silver, copper, gold, palladium, platinum, titanium, vanadium, cobalt, iron, tin, tungsten, molybdenum, rhodium, niobium, carbon, graphite, silicon, germanium and compounds, mixtures or alloys thereof.

4. A document of value according to claim 3 wherein said dielectric layer is selected from the group consisting of zinc sulfide, zinc oxide, zirconium oxide, zirconium dioxide, titanium dioxide, diamond-like carbon, indium oxide, indium-tin-oxide, tantalum pentoxide, cerium oxide, yttrium oxide, europium oxide, iron oxides, hafnium nitride, hafnium carbide, hafnium oxide, lanthanum oxide, magnesium oxide, magnesium fluoride, neodymium oxide, praseodymium oxide, samarium oxide, antimony trioxide, silicon monoxide, silicon dioxide, selenium trioxide, tin oxide, tungsten trioxide and combinations thereof as well as organic polymer acrylates.

5. A document of value according to claim 4 wherein said absorber layer is selected from the group consisting of chromium, nickel, aluminum, silver, copper, palladium, platinum, titanium, vanadium, cobalt, iron, tin, tungsten, molybdenum, rhodium, niobium, carbon, graphite, silicon, germanium and compounds, mixtures or alloys thereof.

6. A document of value according to claim 1 further comprising a cover layer disposed on said reflective layer after tailoring and prior to incorporation of the security device on said sheet-like substrate.

7. A document of value according to claim 6 further comprising an adhesive layer bonding said cover layer to said reflective layer.

8. A document of value according to claim 7 wherein said reflective layer is selected from the group consisting of aluminum, chromium, nickel, silver, copper, gold, palladium, platinum, titanium, vanadium, cobalt, iron, tin, tungsten, molybdenum, rhodium, niobium, carbon, graphite, silicon, germanium and compounds, mixtures or alloys thereof.

9. A document of value according to claim 8 wherein said absorber layer is selected from the group consisting of chromium, nickel, aluminum, silver, copper, palladium, platinum, titanium, vanadium, cobalt, iron, tin, tungsten, molybdenum, rhodium, niobium, carbon, graphite, silicon, germanium and compounds, mixtures or alloys thereof and wherein said dielectric layer is selected from the group consisting of zinc sulfide, zinc oxide, zirconium oxide, zirconium dioxide, titanium dioxide, diamond-like carbon, indium oxide, indium-tin-oxide, tantalum pentoxide, cerium oxide, yttrium oxide, europium oxide, iron oxides, hafnium nitride, hafnium carbide, hafnium oxide, lanthanum oxide, magnesium oxide, magnesium fluoride, neodymium oxide, praseodymium oxide, samarium oxide, antimony trioxide, silicon monoxide, silicon dioxide, selenium trioxide, tin oxide, tungsten trioxide and combinations thereof as well as organic polymer acrylates.

10. A document of value according to claim 9 wherein said reflective layer is formed of aluminum, said absorber layer is a Ni/Cr/Fe semi-transparent alloy and said dielectric layer is formed of silicon dioxide.

11. A document of value according to claim 1 wherein said security device is in the form of a thread woven into said sheet-like substrate, said sheet-like substrate having at least one window therein to expose at least a portion of said security device.

12. A document of value according to claim 11 wherein said sheet-like substrate is a banknote.

13. A document of value according to claim 12 further comprising a cover layer disposed on said reflective layer.

14. A document of value according to claim 13 further comprising an adhesive layer bonding said cover layer to said reflective layer.

15. A document of value according to claim 14 wherein said reflective layer is selected from the group consisting of aluminum, chromium, nickel, silver, copper, gold, palladium, platinum, titanium, vanadium, cobalt, iron, tin, tungsten, molybdenum, rhodium, niobium, carbon, graphite, silicon, germanium and compounds, mixtures or alloys thereof.

16. A document of value according to claim 15 wherein said absorber layer is selected from the group consisting of chromium, nickel, aluminum, silver, copper, palladium, platinum, titanium, vanadium, cobalt, iron, tin, tungsten, molybdenum, rhodium, niobium, carbon, graphite, silicon, germanium and compounds, mixtures or alloys thereof and wherein said dielectric layer is selected from the group consisting of zinc sulfide, zinc oxide, zirconium oxide, zirconium dioxide, titanium dioxide, diamond-like carbon, indium oxide, indium-tin-oxide, tantalum pentoxide, cerium oxide, yttrium oxide, europium oxide, iron oxides, hafnium nitride, hafnium carbide, hafnium oxide, lanthanum oxide, magnesium oxide, magnesium fluoride, neodymium oxide, praseodymium oxide, samarium oxide, antimony trioxide, silicon monoxide, silicon dioxide, selenium trioxide, tin oxide, tungsten trioxide and combinations thereof as well as organic polymer acrylates.

17. A document of value according to claim 16 wherein said reflective layer is formed of aluminum, said absorber layer is a Ni/Cr/Fe semi-transparent alloy and said dielectric layer is formed of silicon dioxide.

18. A document of value according to claim 13 wherein said carrier and said cover layer are formed of plastic material.

19. A document of value according to claim 18 wherein said carrier and said cover layer are formed of polyethylene teraphathalate.

20. A document of value according to claim 18 wherein said carrier is embossed with an optical interference pattern.

21. A document of value according to claim 20 wherein said optical interference pattern is selected from the group consisting of a diffraction grating, a refraction pattern, a holographic image pattern or combination thereof.

22. A document of value according to claim 21 wherein said optical interference pattern includes microstructures having dimensions in the range of from about 0.1 to 10 microns.

23. A document of value according to claim 18 wherein said carrier is coated with a lacquer, said lacquer being embossed with an optical interference pattern.

24. A document of value according to claim 23 wherein said optical interference pattern is selected from the group consisting of a diffraction grating, a refraction pattern, a holographic image pattern or combination thereof.

25. A document of value according to claim 24 wherein said optical interference pattern includes microstructures having dimensions in the range of from about 0.1 to 10 microns.

26. A method of manufacturing a secure document of value including a sheet-like substrate and a thin film, optically variable security device incorporated into said sheet-like substrate, said method comprising the steps of:

tailoring a thin film optically variable security device including a carrier and a multilayer coating on the carrier, said coating comprising an exposed reflective layer disposed on at least two underlying layers, said at least two underlying layers comprising at least one semi-transparent absorber layer disposed on said carrier and at least one dielectric layer disposed on said absorber layer, said tailoring comprising demetallizing selected locations of said exposed reflective layer of said multilayer coating to expose only the dielectric layer of said coating directly beneath said reflective layer at said selected locations to form at least one of an image, pattern or text on said security device after manufacture of said security device by a security device manufacturer;

bonding a cover layer over said demetallized reflective layer; and incorporating the security device including said cover layer into said sheet-like substrate.

27. The method of claim 26 wherein said sheet-like substrate is a banknote and wherein during said incorporating said security device is woven into said banknote.

* * * * *

US007161738C1

(12) EX PARTE REEXAMINATION CERTIFICATE (8794th)

United States Patent

(10) Number: US 7,161,738 C1

Disano et al.

(45) Certificate Issued: Jan. 10, 2012

(54) SECURE DOCUMENT OF VALUE AND METHOD OF MANUFACTURING SAME

(75) Inventors: John N. Disano, Ottawa (CA); Omar Caporaletti, Mississauga (CA)

(73) Assignee: Giesecke & Devrient GmbH, Munich (DE)

Reexamination Request:
No. 90/011,493, Feb. 16, 2011

Reexamination Certificate for:

| | |
|---|---|
| Patent No.: | **7,161,738** |
| Issued: | **Jan. 9, 2007** |
| Appl. No.: | **10/636,786** |
| Filed: | **Aug. 7, 2003** |

(51) Int. Cl.
*G02B 1/10* (2006.01)

(52) U.S. Cl. .......................... 359/585; 359/586; 283/91; 283/72

(58) Field of Classification Search ................... 359/586
See application file for complete search history.

(56) References Cited

To view the complete listing of prior art documents cited during the proceeding for Reexamination Control Number 90/011,493, please refer to the USPTO's public Patent Application Information Retrieval (PAIR) system under the Display References tab.

*Primary Examiner*—Stephen Stein

(57) ABSTRACT

A secure document value includes a sheet-like substrate and a thin film, optically variable security device on the substrate. The security device includes a carrier and a multilayer coating on the carrier. The multilayer coating includes a dielectric-metal stack having an exposed reflective layer that is tailored after manufacture to include security data proprietary to the issuer of the document of value thereby to deter forgery. Since the security device is tailored after manufacture, the end supplier of the document of value does not need to provide the proprietary information to the manufacturer of the security device for incorporation therein. This also enables the manufacturer of the security device to stockpile material unitl such time the material must be customized to include proprietary data. This results in shorter lead times and better response to market demands.

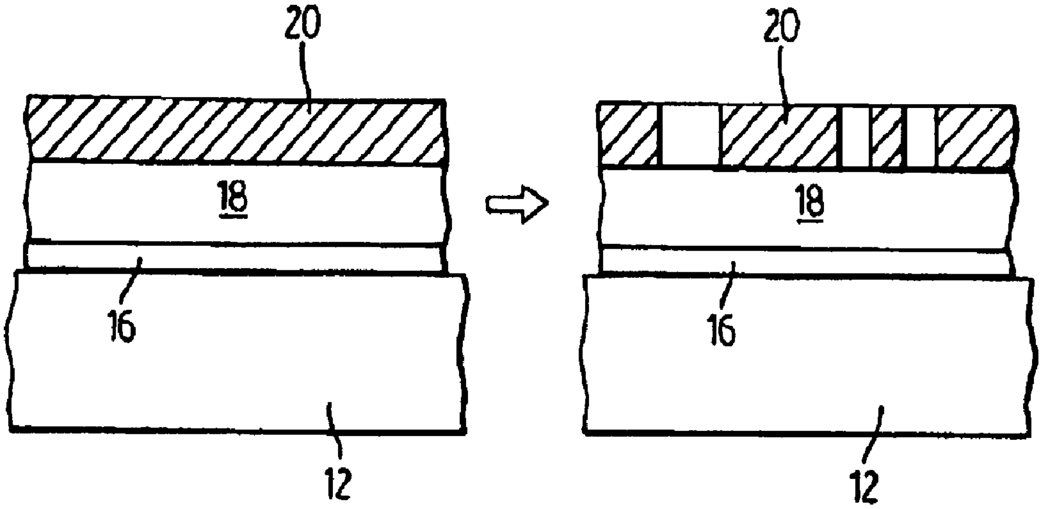

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-27 is confirmed.

New claims 28-47 are added and determined to be patentable.

*28. The method of claim 26 wherein said step of tailoring includes making at least one of an image, pattern or text in said reflective layer.*

*29. The method of claim 26 wherein the reflective layer is selected from the group consisting of aluminum, chromium, nickel, silver, copper, gold, palladium, platinum, titanium, vanadium, cobalt, iron, tin, tungsten, molybdenum, rhodium, niobium, carbon, graphite, silicon, germanium and compounds, mixtures or alloys thereof.*

*30. The method of claim 26 wherein said step of bonding the cover layer over the reflective layer comprises disposing an adhesive layer therebetween.*

*31. The method of claim 26 wherein the reflective layer is formed of aluminum, the absorber layer is a Ni/Cr/Fe semi-transparent alloy and the dielectric layer is formed of silicon dioxide.*

*32. The method of claim 26 wherein the security device is in the form of a thread woven into the sheet-like substrate, the sheet-like substrate having at least one window therein to expose at least a portion of the security device.*

*33. The method of claim 26 wherein the carrier and said cover layer are formed of plastic material.*

*34. The method of claim 26 wherein the carrier is embossed with an optical interference pattern.*

*35. The method of claim 26 wherein the carrier is coated with a lacquer, the lacquer being embossed with an optical interference pattern.*

*36. A method of producing the document of value of claim 1, comprising:*

*providing the thin film optically variable security device, prior to demetallization of the reflective layer, as a to-be-tailored thin film optically variable security device comprising said carrier and said multilayer coating on said carrier, tailoring said to-be-tailored thin film security device by demetallizing the reflective layer of said coating at said selected locations to expose only the dielectric layer of said dielectric-metal stack directly beneath said reflective layer at said selected locations, and providing the tailored security device on said sheet-like substrate.*

*37. The method of claim 36 wherein said step of providing the to-be-tailored security device comprises obtaining the to-be-tailored security device from a stockpile.*

*38. The method of claim 36 wherein said step of tailoring is performed by a third party different from a manufacturer of the to-be-tailored security device.*

*39. The method of claim 38 wherein said step of tailoring is performed by an issuer of the document of value.*

*40. The method of claim 36, further comprising bonding a cover layer over the demetallized reflective layer.*

*41. The method of claim 40, further comprising incorporating the security device including said cover layer into said sheet-like substrate.*

*42. The method of claim 36 wherein said step of tailoring includes making at least one of an image, pattern or text in said reflective layer.*

*43. The method of claim 36 wherein the reflective layer is selected from the group consisting of aluminum, chromium, nickel, silver, copper, gold, palladium, platinum, titanium, vanadium, cobalt, iron, tin, tungsten, molybdenum, rhodium, niobium, carbon, graphite, silicon, germanium and compounds, mixtures or alloys thereof.*

*44. The method of claim 36 wherein the reflective layer is formed of aluminum, said absorber layer is a Ni/Cr/Fe semi-transparent alloy and said dielectric layer is formed of silicon dioxide.*

*45. The method of claim 36 wherein the security device is in the form of a thread woven into the sheet-like substrate, the sheet-like substrate having at least one window therein to expose at least a portion of the security device.*

*46. The method of claim 36 wherein the sheet-like substrate is a banknote.*

*47. The method of claim 36 wherein the carrier is coated with a lacquer, the lacquer being embossed with an optical interference pattern.*

* * * * *

US007161738C2

(12) EX PARTE REEXAMINATION CERTIFICATE (9680th)

United States Patent

Disano et al.

(10) Number: US 7,161,738 C2

(45) Certificate Issued: May 28, 2013

(54) SECURE DOCUMENT OF VALUE AND METHOD OF MANUFACTURING SAME

(75) Inventors: John N. Disano, Ottawa (CA); Omar Caporaletti, Mississauga (CA)

(73) Assignee: Giesecke & Devrient GmbH, Munich (DE)

Reexamination Request:
No. 90/009,973, Dec. 8, 2011

Reexamination Certificate for:

| | |
|---|---|
| Patent No.: | **7,161,738** |
| Issued: | **Jan. 9, 2007** |
| Appl. No.: | **10/636,786** |
| Filed: | **Aug. 7, 2003** |

Reexamination Certificate C1 7,161,738 issued Jan. 10, 2012

(51) Int. Cl.
*G02B 1/10* (2006.01)

(52) U.S. Cl.
USPC ................ 359/585; 359/586; 283/72; 283/91

(58) Field of Classification Search
None
See application file for complete search history.

(56) References Cited

To view the complete listing of prior art documents cited during the proceeding for Reexamination Control Number 90/009,973, please refer to the USPTO's public Patent Application Information Retrieval (PAIR) system under the Display References tab.

*Primary Examiner* — Ling Xu

(57) ABSTRACT

A secure document value includes a sheet-like substrate and a thin film, optically variable security device on the substrate. The security device includes a carrier and a multilayer coating on the carrier. The multilayer coating includes a dielectric-metal stack having an exposed reflective layer that is tailored after manufacture to include security data proprietary to the issuer of the document of value thereby to deter forgery. Since the security device is tailored after manufacture, the end supplier of the document of value does not need to provide the proprietary information to the manufacturer of the security device for incorporation therein. This also enables the manufacturer of the security device to stockpile material until such time the material must be customized to include proprietary data. This results in shorter lead times and better response to market demands.

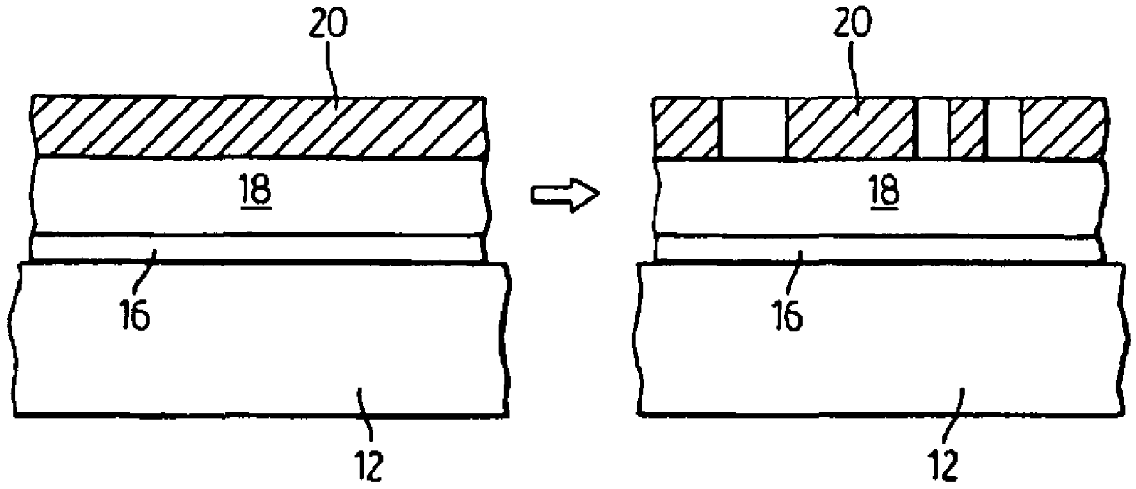

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-2, 6, 11-25 and 38 are cancelled.

Claims 3-5, 7-10, 26, 36 and 39 are determined to be patentable as amended.

Claims 27-35, 37 and 40-47, dependent on an amended claim, are determined to be patentable.

New claims 48-53 are added and determined to be patentable.

3. [A document of value] *The method* according to claim [2] *42* wherein said reflective layer is selected from the group consisting of aluminum, chromium, nickel, silver, copper, gold, palladium, platinum, titanium, vanadium, cobalt, iron, tin, tungsten, molybdenum, rhodium, niobium, carbon, graphite, silicon, germanium and compounds, mixtures or alloys thereof.

4. [A document of value] *The method* according to claim 3 wherein said dielectric layer is selected from the group consisting of zinc sulfide, zinc oxide, zirconium oxide, zirconium dioxide, titanium dioxide, diamond-like carbon, indium oxide, indium-tin-oxide, tantalum pentoxide, cerium oxide, yttrium oxide, europium oxide, iron oxides, hafnium nitride, hafnium carbide, hafnium oxide, lanthanum oxide, magnesium oxide, magnesium fluoride, neodymium oxide, praseodymium oxide, samarium oxide, antimony trioxide, silicon monoxide, silicon dioxide, selenium trioxide, tin oxide, tungsten trioxide and combinations thereof as well as organic polymer acrylates.

5. [A document of value] *The method* according to claim 4 wherein said absorber layer is selected from the group consisting of chromium, nickel, aluminum, silver, copper, palladium, platinum, titanium, vanadium, cobalt, iron, tin, tungsten, molybdenum, rhodium, niobium, carbon, graphite, silicon, germanium and compounds, mixtures or alloys thereof.

7. [A document of value] *The method* according to claim [6] *48* further comprising an adhesive layer bonding said cover layer to said reflective layer.

8. [A document of value] *The method* according to claim 7 wherein said reflective layer is selected from the group consisting of aluminum, chromium, nickel, silver, copper, gold, palladium, platinum, titanium, vanadium, cobalt, iron, tin, tungsten, molybdenum, rhodium, niobium, carbon, graphite, silicon, germanium and compounds, mixtures or alloys thereof.

9. [A document of value] *The method* according to claim 8 wherein said absorber layer is selected from the group consisting of chromium, nickel, aluminum, silver, copper, palladium, platinum, titanium, vanadium, cobalt, iron, tin, tungsten, molybdenum, rhodium, niobium, carbon, graphite, silicon, germanium and compounds, mixtures or alloys thereof and wherein said dielectric layer is selected from the group consisting of zinc sulfide, zinc oxide, zirconium oxide, zirconium dioxide, titanium dioxide, diamond-like carbon, indium oxide, indium-tin-oxide, tantalum pentoxide, cerium oxide, yttrium oxide, europium oxide, iron oxides, hafnium nitride, hafnium carbide, hafnium oxide, lanthanum oxide, magnesium oxide, magnesium fluoride, neodymium oxide, praseodymium oxide, samarium oxide, antimony trioxide, silicon monoxide, silicon dioxide, selenium trioxide, tin oxide, tungsten trioxide and combinations thereof as well as organic polymer acrylates.

10. [A document of value] *The method* according to claim 9 wherein said reflective layer is formed of aluminum, said absorber layer is a Ni/Cr/Fe semi-transparent alloy and said dielectric layer is formed of silicon dioxide.

26. A method of manufacturing a secure document of value including a sheet-like substrate and a thin film, optically variable security device incorporated into said sheet-like substrate, said method comprising the steps of:

tailoring a thin film optically variable security device including a carrier and a multilayer coating on the carrier, said coating comprising an exposed reflective layer disposed on at least two underlying layers, said at least two underlying layers comprising at least one semi-transparent absorber layer disposed on said carrier and at least one dielectric layer disposed on said absorber layer, said tailoring comprising demetallizing selected locations of said exposed reflective layer of said multilayer coating to expose only the dielectric layer of said coating directly beneath said reflective layer at said selected locations to form at least one of an image, pattern or text on said security device after manufacture of said security device by a security device manufacturer;

bonding a cover layer over said demetallized reflective layer; and incorporating the security device including said cover layer into said sheet-like substrate,

*wherein said step of tailoring is performed by a third party different from the security device manufacturer.*

36. A method of producing [the] *a* document of value [of claim 1,] *comprising a sheet-like substrate and a thin film, optically variable security device on said substrate, said security device comprising a carrier and a multilayer coating on said carrier, said coating comprising a dielectric-metal stack of layers comprising an exposed reflective layer disposed on underlying layers of said dielectric-metal stack, the underlying layers of said dielectric-metal stack comprising at least one semi-transparent absorber layer disposed on said carrier and at least one dielectric layer disposed on said absorber layer, said reflective layer being demetallized at selected locations after manufacture of said security device to expose only the dielectric layer of said dielectric-metal stack directly beneath said reflective layer at said selected locations thereby to tailor said security device, the method* comprising:

providing the thin film optically variable security device, prior to demetallization of the reflective layer, as a to-be-tailored thin film optically variable security device comprising said carrier and said multilayer coating on said carrier, tailoring said to-be-tailored thin film security device by demetallizing the reflective layer of said coating at said selected locations to expose only the dielectric layer of said dielectric-metal stack directly beneath said reflective layer at said selected locations, and providing the tailored security device on said sheet-like substrate,

*wherein said step of tailoring is performed by a third party different from a manufacturer of the to-be-tailored security device.*

39. The method of claim [38] *36* wherein said step of tailoring is performed by an issuer of the document of value.

*48. The method of claim 40, wherein said cover layer disposed on said reflective layer is attached after tailoring and prior to incorporation of the security device on said sheet-like substrate.*

*49. The method of claim 26, wherein said step of bonding a cover layer over said demetallized reflective layer is performed after said step of tailoring and prior to said step of incorporating of the security device into said sheet-like substrate.*

*50. The method of claim 26 further comprising the step of providing a to-be-tailored security device prior to said step of tailoring.*

*51. The method of claim 50, wherein said step of providing the to-be-tailored security device comprises obtaining the to-be-tailored security device from a stockpile.*

*52. The method of claim 26 wherein said step of tailoring is performed by an issuer of the document of value.*

*53. The method of claim 26 wherein said sheet-like substrate is a banknote.*

* * * * *